(12) United States Patent
Huang et al.

(10) Patent No.: US 11,874,387 B2
(45) Date of Patent: Jan. 16, 2024

(54) MOBILE DEVICE THREE-DIMENSIONAL LOCATION SERVICE

(71) Applicant: AT&T Intellectual Property I, L.P., Atlanta, GA (US)

(72) Inventors: Haiyun Huang, San Jose, CA (US); Eric Parker, Plano, TX (US); Roy Areeckal, Plano, TX (US); Saeed Mir, Schaumburg, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 281 days.

(21) Appl. No.: 16/864,801

(22) Filed: May 1, 2020

(65) Prior Publication Data
US 2021/0341561 A1    Nov. 4, 2021

(51) Int. Cl.
*G01C 5/06* (2006.01)
*G01S 5/00* (2006.01)
*G01L 19/08* (2006.01)

(52) U.S. Cl.
CPC .............. *G01S 5/0018* (2013.01); *G01C 5/06* (2013.01); *G01L 19/086* (2013.01)

(58) Field of Classification Search
CPC ........ G01S 5/0018; G01C 5/06; G01L 19/086
See application file for complete search history.

(56) References Cited

U.S. PATENT DOCUMENTS

| 2015/0133145 | A1* | 5/2015 | Palanki | H04W 64/006 455/456.1 |
| 2017/0219342 | A1* | 8/2017 | Morioka | G01C 5/06 |

OTHER PUBLICATIONS

Tim McVicar, et al, "On the use of elevation, altitude, and height in the ecological and climatological literature", Oecologia, Aug. 2012, pp. 1-10.

* cited by examiner

*Primary Examiner* — Marcos L Torres

(57) ABSTRACT

A processing system including at least one processor may obtain a location of a mobile device and a barometric pressure reading of the mobile device, identify a weather reference area and a ground reference area containing the location, and calculate an elevation of the mobile device from the barometric pressure reading of the mobile device and a barometric pressure metric of a weather reference point of the weather reference area, where the weather reference point has a predetermined elevation. The processing system may then determine a height of the mobile device over a ground level of the location based upon the elevation of the mobile device that is calculated and based upon an elevation of a ground reference area containing the location and provide a report of the location of mobile device including the height of the mobile device over the ground level that is determined.

18 Claims, 6 Drawing Sheets

FIG. 4
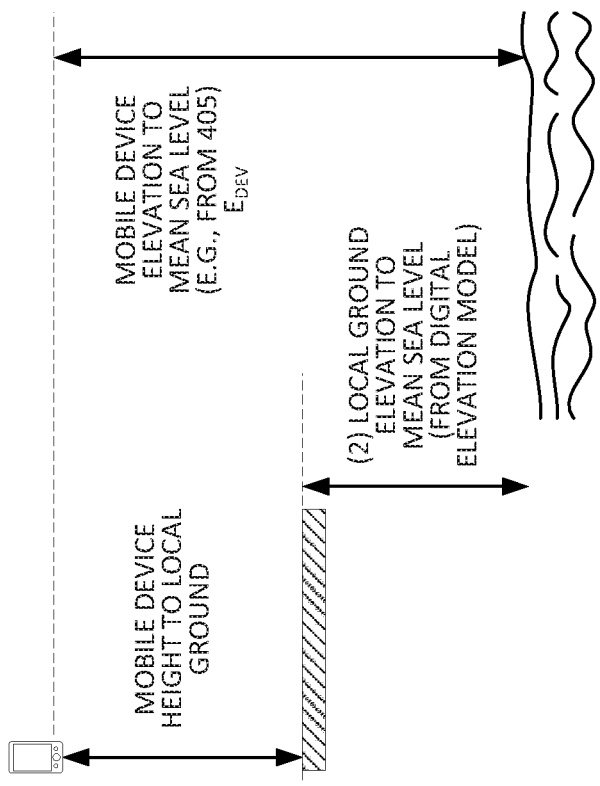
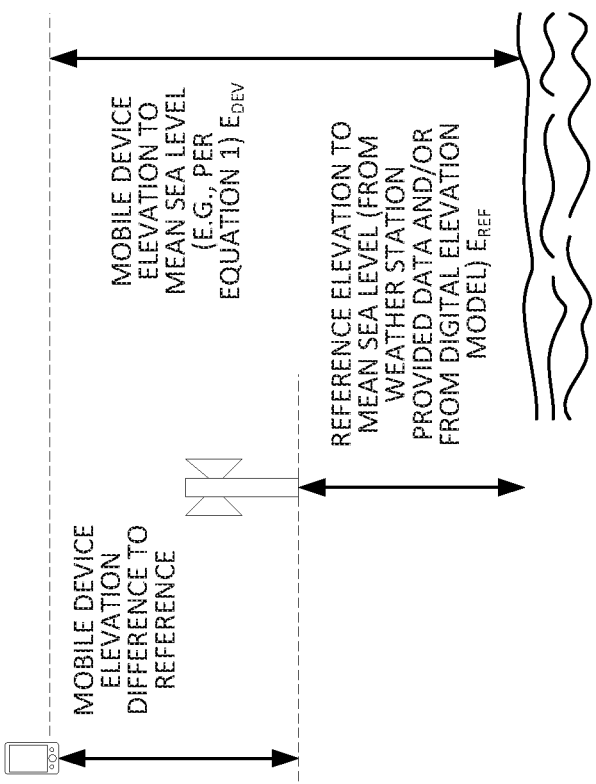
EQUATION 2: $E_{dev} = \dfrac{\left(\left(\dfrac{P_0}{P}\right)^{1/5.257} - 1\right) T_{kelvin}}{0.0065} + E_{ref}$

MOBILE DEVICE THREE-DIMENSIONAL LOCATION SERVICE

The present disclosure relates to mobile device location estimation, and more particularly to methods, computer-readable media, and apparatuses for determining a height of a mobile device over a ground level based upon an elevation of the mobile device that is calculated from a barometric pressure reading of the mobile device and a barometric pressure metric of a weather reference point and further based upon an elevation of a ground reference area.

BACKGROUND

A global navigation satellite system (GNSS), such as Global Positioning System (GPS) is generally limited in providing elevation information for a receiver. For instance, GNSS may use three satellites to estimate latitude and longitude, while at least a fourth satellite is required to estimate elevation. This prerequisite is often not met because of weak satellite signals or unavailability of line of sight. In addition, even where four satellites are available for a given location, GNSS may estimate elevation relative to ellipsoid datum, which is a theoretical and ideal-earth model. This elevation measure is not relative to mean sea level or to ground. Other techniques to determine device elevation include the use of location beacons, involving technologies such as Wi-Fi, Bluetooth, and/or barometric pressure to estimate relative elevation between beacon(s) and device(s). However, this type of service may only be available for places with beacons installed.

SUMMARY

The present disclosure broadly describes methods, non-transitory (i.e., tangible or physical) computer-readable storage media, and apparatuses for determining a height of a mobile device over a ground level based upon an elevation of the mobile device that is calculated from a barometric pressure reading of the mobile device and a barometric pressure metric of a weather reference point and further based upon an elevation of a ground reference area. For instance, in one example, a processing system including at least one processor may obtain a location of a mobile device and a barometric pressure reading of the mobile device, identify a weather reference area and a ground reference area containing the location, and calculate an elevation of the mobile device from the barometric pressure reading of the mobile device and a barometric pressure metric of a weather reference point of the weather reference area, where the weather reference point has a predetermined elevation. The processing system may then determine a height of the mobile device over a ground level of the location based upon the elevation of the mobile device that is calculated and based upon an elevation of a ground reference area containing the location and provide a report of the location of mobile device including the height of the mobile device over the ground level that is determined.

BRIEF DESCRIPTION OF THE DRAWINGS

The teachings of the present disclosure can be readily understood by considering the following detailed description in conjunction with the accompanying drawings, in which:

FIG. 4 illustrates an example of calculating a mobile device elevation to mean sea level using a weather reference point and an example of calculating a mobile device height over a local ground using a ground reference area;

To facilitate understanding, identical reference numerals have been used, where possible, to designate identical elements that are common to the figures.

DETAILED DESCRIPTION

Examples of the present disclosure describe methods, non-transitory (i.e., tangible or physical) computer-readable storage media, and apparatuses for determining a height of a mobile device over a ground level based upon an elevation of the mobile device that is calculated from a barometric pressure reading of the mobile device and a barometric pressure metric of a weather reference point and further based upon an elevation of a ground reference area. In particular, examples of the present disclosure provide a mobile device three-dimensional (3D) location service that uses atmospheric measurements, specifically barometric pressure, or atmospheric pressure measurements (and in some cases, temperature measurements) to estimate mobile device elevation with respect to mean sea level and height over local ground, for circumstances of both inside and outside of buildings. In one example, the present disclosure may infer weather reference points from mobile device crowdsourcing. In accordance with the present disclosure, mobile devices are equipped to measure atmospheric data (e.g., barometric pressure). Notably, full-time internet connections are not required, nor is the deployment of new sensors, beacons, etc. In addition, in various example, the present disclosure also incorporates nearby atmospheric corrections, discretized weather reference areas (e.g., weather reference blocks) and discretized ground reference areas (e.g., ground reference blocks). Inferring weather reference points, and utilizing localized corrections builds a self-calibrated weather reference grid even when there is no physical weather station in a weather reference block. Thus, the weather reference point can provide a reliable and accurate calculation base. At the same time, both weather reference blocks and ground references blocks provide discretization of geography and topography features at different granularities. Adjustment of the sizes of the weather reference blocks and ground reference blocks may reduce computing complexity for different end uses.

In addition, the present disclosure may be implemented in a distributed computing system (e.g., a processing system), and is scalable to process 3D location estimates for a large number of mobile devices (e.g., tens of millions of devices)

as a continuous service on a national (and/or global scale). Examples of the present disclosure therefore provide a practical, low-cost implementation to provide 3D location estimates (including elevation and/or height) where mobile devices may be underground, inside multi-floor/multi-story buildings, and so forth. In addition, the mobile device elevation estimates may be generated with an accuracy that may be used for network planning, emergency rescue situations, security checks, and many other situations. These and other aspects of the present disclosure are discussed in greater detail below in connection with the examples of FIGS. 1-6.

Figure 1:
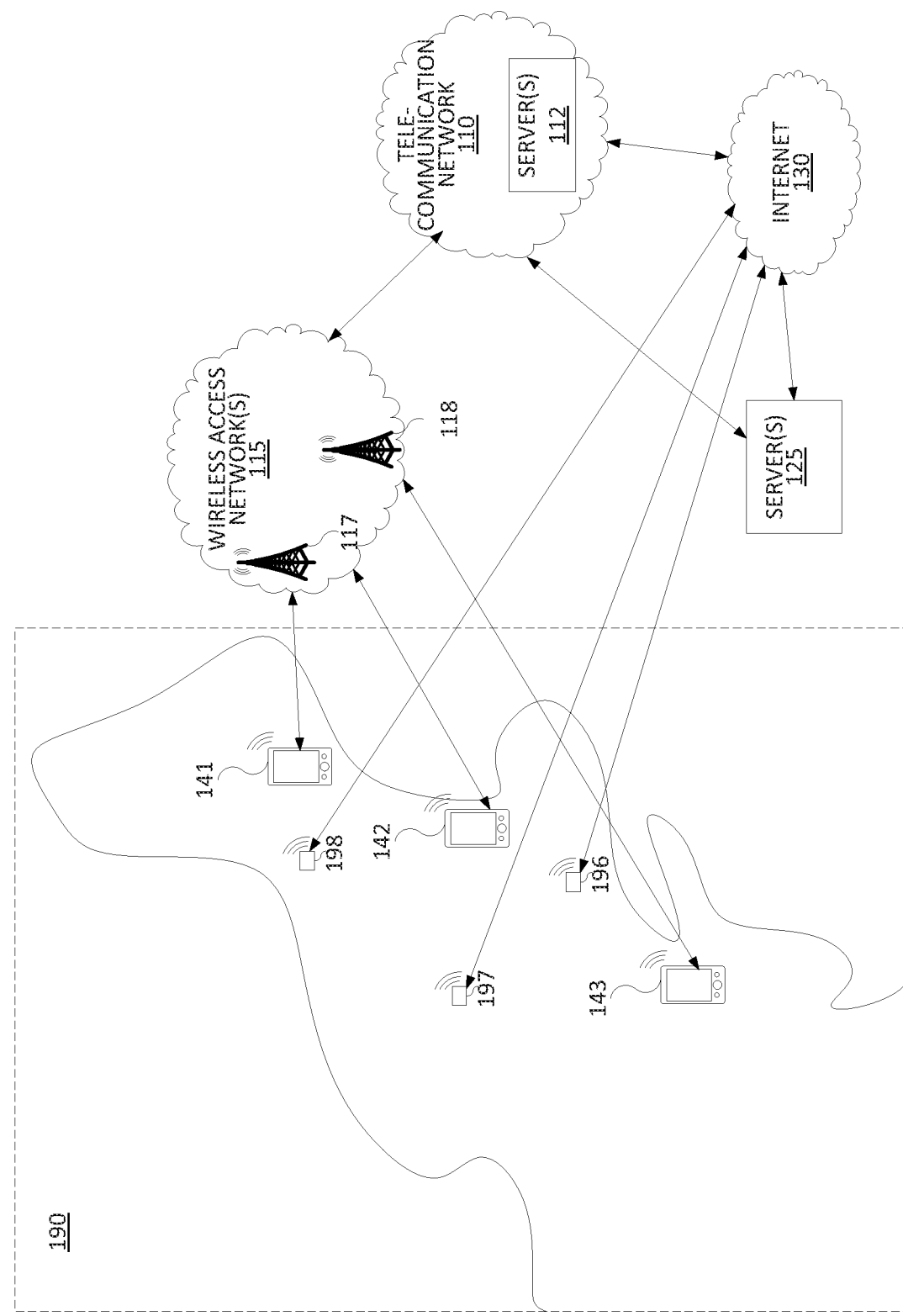
FIG. 1 illustrates an example system related to the present disclosure.

To aid in understanding the present disclosure, FIG. 1 illustrates an example system 100, related to the present disclosure. As shown in FIG. 1, the system 100 connects mobile devices 141-143, server(s) 112, server(s) 125, and weather stations 196-198 with one another and with various other devices via a core network, e.g., a telecommunication network 110, a wireless access network 115 (e.g., a cellular network), and Internet 130. In one example, the weather stations 196-198 may be managed and/or operated by a weather service provider or weather data service (e.g., the National Weather Service (NWS), or the like).

Figure 6:
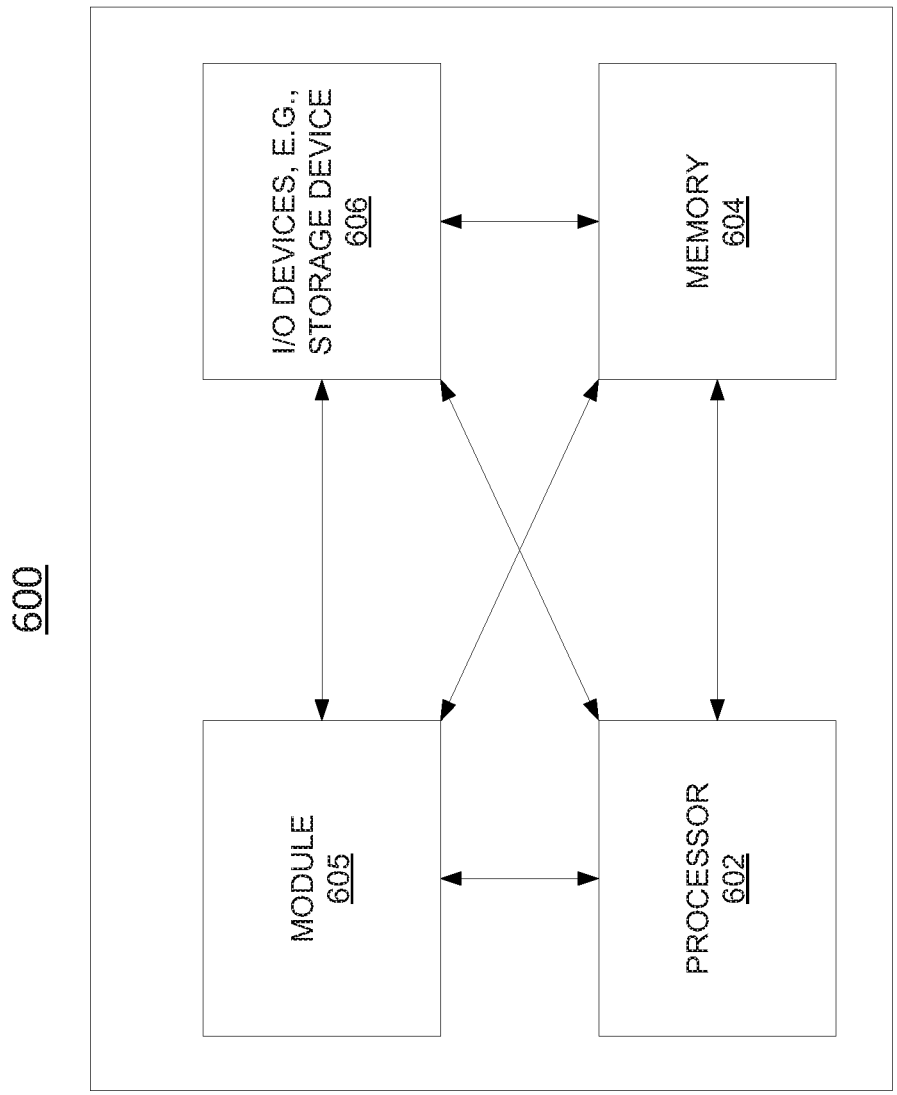
FIG. 6 illustrates a high-level block diagram of a computing device specially programmed to perform the functions described herein.

In one example, the server(s) 125 may each comprise a computing system, such as computing system 600 depicted in FIG. 6, and may be configured to provide one or more functions in connection with examples of the present disclosure for determining a height of a mobile device over a ground level based upon an elevation of the mobile device that is calculated from a barometric pressure reading of the mobile device and a barometric pressure metric of a weather reference point and further based upon an elevation of a ground reference area. For example, server(s) 125 may be configured to perform one or more steps, functions, or operations in connection with the example method 500 described below. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 6 and discussed below) or multiple computing devices collectively configured to perform various steps, functions, and/or operations in accordance with the present disclosure.

In one example, server(s) 125 may receive and store weather data from weather stations 196-198, such as temperature measurements, barometric pressure measurements, wind speed measurements (including magnitude and direction), humidity measurements, and so forth. For instance, the server(s) 125 may be server(s) of a weather service provider/weather data service (WDS) and may obtain the weather data from weather stations 196-198, e.g., via connections over the Internet 130.

In one example, the system 100 includes a telecommunication network 110. In one example, telecommunication network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets.

However, it will be appreciated that the present disclosure is equally applicable to other types of data units and transport protocols, such as Frame Relay, and Asynchronous Transfer Mode (ATM). In one example, the telecommunication network 110 uses a network function virtualization infrastructure (NFVI), e.g., host devices or servers that are available as host devices to host virtual machines comprising virtual network functions (VNFs). In other words, at least a portion of the telecommunication network 110 may incorporate software-defined network (SDN) components.

As shown in FIG. 1, telecommunication network 110 may also include one or more servers 112. In one example, each of the server(s) 112 may comprise a computing system, such as computing system 600 depicted in FIG. 6, and may be configured to provide one or more functions for determining a height of a mobile device over a ground level based upon an elevation of the mobile device that is calculated from a barometric pressure reading of the mobile device and a barometric pressure metric of a weather reference point and further based upon an elevation of a ground reference area, in accordance with the present disclosure. For example, one or more of the server(s) 112 may be configured to perform one or more steps, functions, or operations in connection with the example method 500 described below. For instance, server(s) 112 may collect, store, and process mobile device position/location information (e.g., in latitude and longitude), barometric pressure readings, and/or temperature readings, such as from mobile devices 141-143. In addition, server(s) 112 may collect, store, and process weather data, e.g., from weather stations 196-198, server(s) 125, and/or other devices or systems for obtaining weather measurements, which may be utilized in connection with the example method 500 described herein. In particular, server(s) 112 may obtain barometric pressure measurements and temperature measurements (and in some cases, additional weather data, such as humidity measurements, wind speed measurements, etc.) from weather stations 196-198. To illustrate, server(s) 125 may represent a weather data server (WDS). In such an example, the weather data may be obtained by server(s) 112 from server(s) 125 via a weather service data feed, e.g., an NWS extensible markup language (XML) data feed, or the like. In another example, the weather data may be obtained by retrieving the weather data from the WDS. It should be noted that in one example, server(s) 112 may receive and store weather data from multiple parties. For ease of illustration, various additional elements of telecommunication network 110 are omitted from FIG. 1.

In one example, one or more wireless access networks 115 may each comprise a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network(s) 115 may each comprise an access network in accordance with any "second generation" (2G), "third generation" (3G), "fourth generation" (4G), Long Term Evolution (LTE), "fifth generation" (5G), or any other existing or yet to be developed future wireless/cellular network technology. While the present disclosure is not limited to any particular type of wireless access network, in the illustrative example, base stations 117 and 118 may each comprise a Node B, evolved Node B (eNodeB), or gNodeB (gNB), or any combination thereof providing a multi-generational/multi-technology-capable base station. In the present example, mobile devices 141-143 may be in communication with base stations 117 and 118, which provide connectivity between mobile devices 141-143 and other endpoint devices within the system 100, various network-based devices, such as server 112, and so forth. In one example, wireless access network(s) 115 may be operated by the same service provider that is operating telecommunication network 110, or one or more other service providers.

As illustrated in FIG. 1, each of the mobile devices 141-143 may comprise, for example, a cellular telephone, a smartphone, a tablet computing device, a laptop computer, a wireless enabled wristwatch, or any other wireless and/or cellular-capable mobile telephony and computing devices (broadly, a "mobile device" or "mobile endpoint device"). In one example, mobile devices 141-143 may be equipped for cellular and non-cellular wireless communication. For instance, mobile devices 141-143 may include components which support peer-to-peer and/or short range wireless communications. Thus, each of the mobile devices 141-143 may include one or more radio frequency (RF) transceivers, e.g., for cellular communications and/or for non-cellular wireless communications, such as for IEEE 802.11 based communications (e.g., Wi-Fi, Wi-Fi Direct), IEEE 802.15 based communications (e.g., Bluetooth, Bluetooth Low Energy (BLE), and/or ZigBee communications), and so forth.

In addition, in one example, each of the mobile devices 141-143 may comprise all or a portion of a computing device or processing system, such as computing system 600 as described in connection with FIG. 6 below, specifically configured to perform various steps, functions, and/or operations in connection with examples of the present disclosure for determining a height of a mobile device over a ground level based upon an elevation of the mobile device that is calculated from a barometric pressure reading of the mobile device and a barometric pressure metric of a weather reference point and further based upon an elevation of a ground reference area. For instance, in one example, each of mobile devices 141-143 may comprise an embedded application for service metrics gathering and reporting that may be installed by a device manufacturer, and which may have elevated privileges with respect to device hardware. In one example, the embedded application may reside in a virtualization layer between the device hardware and a respective device operating system. In one example, the embedded application is inaccessible to device users or is at least hidden from user accounts.

In one example, the embedded application may be configurable over-the-air, e.g., by an operator of telecommunications service provider network 110, to load profiles which may specify how to collect service metrics, e.g., which service metrics to gather, when to record service metrics (such as according to a schedule and/or in response to detected events or triggers), how to process service metrics to assemble into packages, how to filter gathered service metrics for reporting, when to report service metrics, which service metrics to report, and so forth. For instance, categories of service metrics may include performance indicator data, such as: a reference signal received power (RSRP), a channel quality information (CQI), a signal to noise ratio (SNR), connection information (e.g., a connection to a particular cell, a particular sector, a connection to a non-cellular access point), angle of arrival and/or angle of departure information (e.g., for beamformed wireless communications), and so forth. In accordance with the present disclosure, the service metrics may specifically comprise location information (e.g., latitude and longitude of the device, e.g., as determined via a GPS component of the device) as well as barometric pressure measurements, or readings (e.g., from a built-in/embedded barometer of the device). In one example, the service metrics may further include temperature measurements of a temperature sensor/thermometer of the respective mobile device.

Thus, mobile devices 141-143 may be configured to gather and report various service metrics to one or more network-based systems, such as server(s) 112. In one example, components of wireless access network(s) 115 and telecommunication network 110 may also be configured to route/forward service metrics from mobile devices 141-143 (and other mobile devices) to server(s) 112. For instance, components of wireless access network(s) 115 and/or telecommunication network 110 may be configured as a DMaaP (data movement as a platform) system, may be configured in a Kafka streaming architecture, and so forth. In the present example, the service metrics from mobile devices 141-143 and weather data from weather stations 196-198 may be gathered for a region 190 (e.g., a geographic region). In accordance with the present disclosure, region 190 may be further divided in to weather reference areas and ground references area as described in greater detail below in connection with the examples of FIGS. 2-5.

It should also be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, one or more operations described above with respect to server 112 may alternatively or additionally be performed by server 125, and vice versa. In addition, although server(s) 112 and 125 are illustrated in the example of FIG. 1, in other, further, and different examples, the same or similar functions may be distributed among multiple other devices and/or systems within the telecommunication network 110, wireless access network(s) 115, and/or the system 100 in general that may collectively provide various services in connection with examples of the present disclosure for determining a height of a mobile device over a ground level based upon an elevation of the mobile device that is calculated from a barometric pressure reading of the mobile device and a barometric pressure metric of a weather reference point and further based upon an elevation of a ground reference area.

Additionally, devices that are illustrated and/or described as using one form of communication (such as a cellular or non-cellular wireless communications, wired communications, etc.) may alternatively or additionally utilize one or more other forms of communication. For instance, weather stations 196-198 may alternatively or additionally be equipped for cellular communications, wireless wide-area network (WWAN) communications, and so forth. In such examples, weather stations may communicate with other device or systems, such as server(s) 125 and/or server(s) 112, via base stations 117 and/or 118, wireless access network(s) 115, and so forth. Thus, these and other modifications are all contemplated within the scope of the present disclosure.

Figure 2:
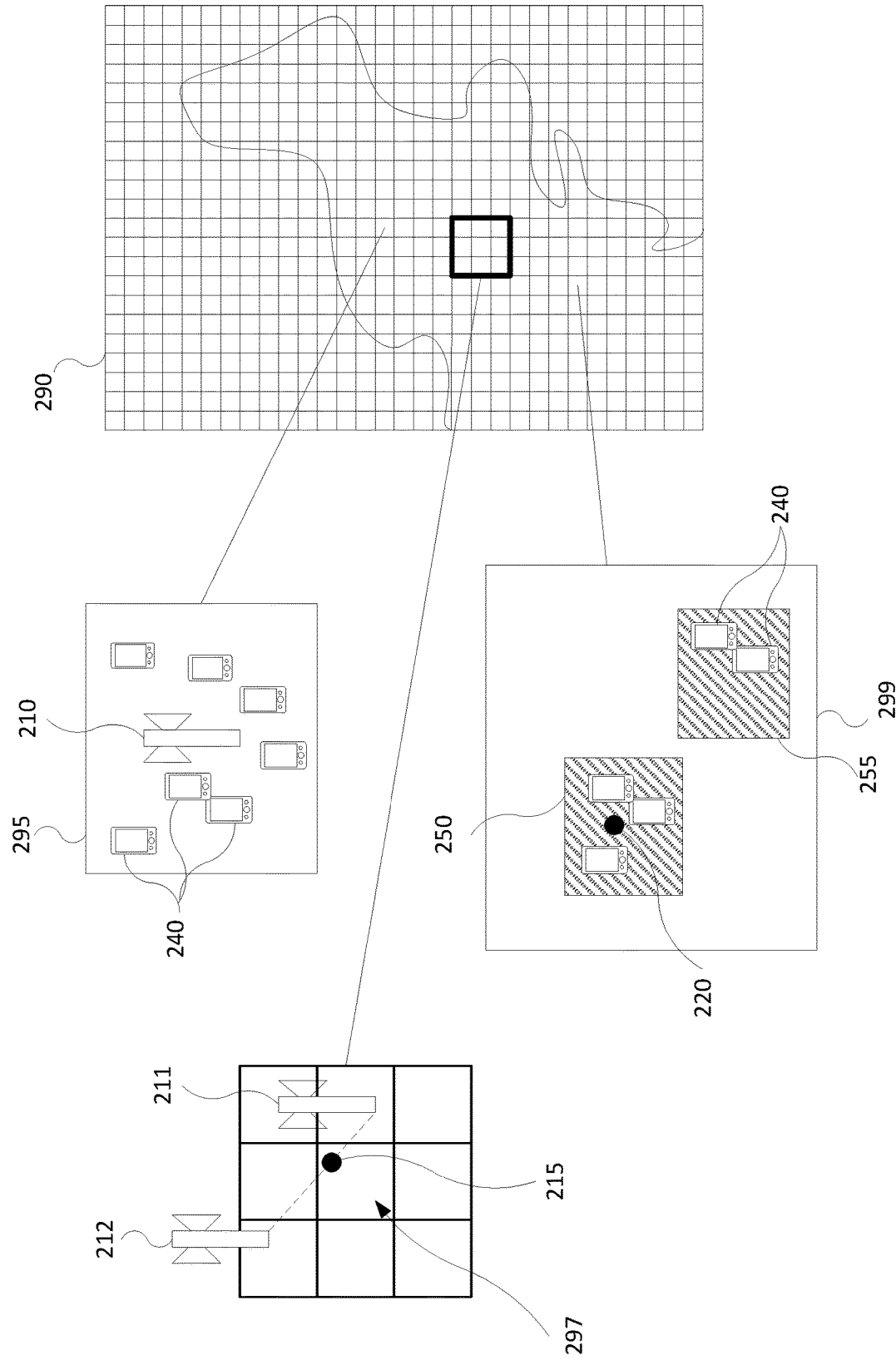
FIG. 2 illustrates an example of sub-division of a region into weather reference areas, and examples of weather reference points within such weather reference areas, in accordance with the present disclosure.

FIG. 2 illustrates a region 290, which may comprise the same or similar region as region 190 of FIG. 1. In one example, the region 290 may be sub-divided into weather reference areas (e.g., weather reference blocks), such as weather reference area 295 (e.g., a weather reference block). For ease of illustration, various additional weather reference areas of region 290 are not specifically labeled in FIG. 2. In addition, as illustrated in FIG. 2, the region 290 may comprise the northeast United States. However, it should be understood that examples of the present disclosure may be applied to regions of different sizes, e.g., including the entire United States, North America, etc., or a smaller and/or differently defined region, such as a state, a province, etc.

In one example, the region 290 is divided in to weather reference areas using a digital elevation model (DEM). In one example, the size of each weather reference area is not larger than an area which may be assumed to have similar weather impacts. In one example, the size of each weather reference area is selected to account for performance capabilities of a processing system performing the operations described herein. As just one example, a weather reference area (such as weather reference area 295) may comprise a 5 km by 5 km square block. In accordance with the present disclosure, each weather reference area is defined to include at least one weather reference point inside. In addition, mobile devices in the same weather reference area are associated with the same weather reference point. For instance, as illustrated in FIG. 2, weather reference block 295 includes a weather station 210 (e.g., a weather reference point) and several mobile devices 240 (for ease of illustration, only some of which are specifically labeled in FIG. 2).

As noted above, each weather reference area is defined to include at least one weather reference point. However, not every weather reference areas may include a weather station therein. In accordance with the present disclosure, the weather reference point may comprise either a physical weather station, or a "virtual" weather reference point derived from physical weather stations (e.g., located in other nearby weather reference areas). For instance, the weather reference area 297 may be assigned a weather reference point 215, which may be interpolated from physical weather stations 211 and 212 in other nearby weather reference areas. For instance, the weather reference point 215 may be selected to lie on a point along a line between weather stations 211 and 212. In such an example, weather data for the weather reference point 215 may be estimated by a linear interpolation, such as averaging barometric pressure measurements of weather stations 211 and 212. In one example, the respective barometric pressure measurements may be weighted based upon distances between the weather stations 211 and 212 (e.g., if the weather reference point 215 is not equidistant from the weather reference stations 211 and 212).

It should be noted that the present example is provided for illustrative purposes, and that in other, further, and different examples a weather reference point may be interpolated or otherwise selected in a different way. For instance, a weather reference point may be selected that does not lie along a line between two weather stations. However, the weather data for the weather reference point may still be calculated by taking an average, or a weighted average of barometric pressure measurements and/or other weather measurements based upon respective distances from weather stations to the weather reference point. It should also be noted that weather reference points may be interpolated from three or more physical weather stations in the same or similar manner. For instance, a "virtual" weather reference point may be selected to be a central point of a weather reference area, and an inverse distance weighted (IDW) function may be used to derive weather metrics from multiple nearby physical weather stations. In still other examples, a "virtual" weather reference point in a weather reference area may be selected and a barometric pressure metric and/or other weather metric may be estimated using one or more weather models, such as provided by one or more weather data services, or the like (e.g., the Global Forecast System (GFS) model, sometimes referred to as the "American" model, the European Center for Medium-Range Weather Forecasts (ECMWF) model, sometimes referred to as the "European" model, the Global Environmental Multiscale (GEM) model, sometimes referred to as the "Canadian" model, and so forth).

In still another example, a weather reference point for a weather reference area (and barometric pressure metrics and/or other weather metrics) may be inferred from crowd devices. For instance, this technique may be used in the absence of nearby weather stations (although such technique may also be used in other situations as well). In one example, the present disclosure utilizes a digital elevation model (DEM), which may comprise a set of raster files or other format files, that records elevations for a set of given points (latitude, longitude). For instance, the digital elevation model may comprise Shuttle Radar Topography Mission (SRTM) data, which may provide measurements of elevation (e.g., relative to mean sea level (MSL)) in 1 arc-second, 30 meter resolution. In one example, the digital elevation model may be obtained from a commercial provider, such as Forsk Atoll, and so forth. In one example, the digital elevation model may comprise a composite of digital elevation models from multiple sources. For instance, the STRM digital elevation model may comprise a primary source, while a more refined secondary digital elevation model may be used to supplement the STRM digital elevation model in certain regions or markets (e.g., in cities, particularly those with varying terrain, etc.) to provide a composite digital elevation model. In one example, the digital elevation model may be obtained and stored in a data storage system controlled by an operator of a processing system of the present disclosure (such as server(s) 112 of FIG. 1). For instance, the elevation data may be stored in a Vertica platform, Hadoop distributed file system (HDFS) cluster, etc., and a processing system implementing the steps, functions, and/or operations described herein may be implemented in a cluster computing framework, such as Apache Spark, or the like.

As illustrated in FIG. 2, a weather reference point 220 may be selected within a weather reference area 299 and inferred (or crowdsourced) from multiple mobile devices 240 using a digital elevation model. In one example, reference ground or flat zones (also referred to herein as "base areas") within the weather reference area 299 are first located, e.g., flat zones 250 and 255. In one example, a reference ground/flat zone is defined as a relatively large and/or continuous area with the same or similar elevation, and/or a small elevation gradient (e.g., less than a threshold gradient and/or slope in any direction within the flat zone). As shown in the present example, there may be multiple base areas within a weather reference area. In one example, mobile devices 240 located within weather reference area 299 may be separated into two categories using a digital elevation model in conjunction with location information of the mobile devices 240. One category is mobile devices located inside base areas/flat zones, called on-base devices. The other category is mobile devices located outside base areas/flat zones, called off-base devices. In accordance with the present disclosure, in one example, it is assumed that on-base devices located in the same base area report similar barometric/atmospheric pressure measurements (and other weather measurements).

If there are multiple base areas in one weather reference area (e.g., flat zones 250 and 255 in weather reference area 299), the present disclosure may select a particular flat zone having the most on-base devices to derive a weather reference point. For instance, in weather reference area 299, flat zone 250 includes three mobile devices 240, while flat zone 255 includes only two mobile devices 240. Accordingly, flat zone 250 may be selected to contain the derived weather reference point 220. In one example, the weather reference point 220 may be selected to be located at a central location or centroid of the flat zone 250, e.g., via geographic averaging. In another example, the weather reference point 220 may be selected to be located at a central location or centroid with respect to locations of mobile devices 240 within the flat zone 250.

In one example, the placement of the weather reference point 220 within the flat zone 250 may be weighted based upon a reliability factor associated with various mobile devices 240. For instance, newer model mobile devices and/or those with more accurate barometers may be more trusted, and may have greater weighting(s) applied such that the location of the weather reference point 220 may tend to be closer to such mobile devices. It should be noted that in addition to selecting a location of the weather reference point 220, the present disclosure may also calculate/estimate weather data for the weather reference point 220 based upon weather measurements of mobile devices 240 within the flat zone 250. For instance, the weather data for the weather reference point 220 may be interpolated or otherwise calculated by taking an average, or a weighted average (e.g., an inverse distance weighted average) of barometric pressure measurements and/or other weather measurements based upon respective distances from the on-base mobile devices 240 (those within flat zone 250) to the weather reference point 220. For instance, such operations may be the same as or similar to that which is described above in connection with weather reference point 215 of weather reference area 297. It should also be noted that once selected, the weather reference point 220 may be used in determining mobile device elevations and heights over ground level for all mobile devices 240 that are within weather reference area 299 (e.g., as described in greater detail below).

It should be noted that in still another example, a weather reference point may be selected in accordance with multiple flat zones in a weather reference area. For instance, weather metrics (e.g., barometric pressure metrics and/or temperature metrics, etc.) may be derived for a plurality of flat zones, similar to the above description. In addition, a weather reference point may be selected in the center of the weather reference area, in a centroid/central location among the flat zones, etc. The weather metrics (e.g., barometric pressure metrics and/or temperature metrics, etc.) for the weather reference point may then may be calculated/interpolated from the respective metrics for each contributing flat zone, e.g., via a geographic interpolation method such as IDW, or the like.

With respect to the physical weather station 210 of weather reference area 295, it should be noted that the elevation of the physical weather station 210 may be measured by a reliable source and may be a published, known elevation. For instance, physical weather stations may often be deployed at or near major airports, and may have precise elevations that are determined via professional survey. With respect to weather reference points 215 and 220, these weather reference points may have calculated locations in latitude and longitude. The respective elevations of these locations may then be determined from the digital elevation model(s) that is/are used for the region 290. In one example, the elevations of physical weather stations, such as weather station 210, may further be verified via the digital elevation model (to confirm a match to stated elevations). As such, the elevations of the weather reference points (both physical weather stations and virtual weather reference points) may be predetermined. The elevations of weather reference points (including physical weather stations) are used to calculate altitudes and heights over ground for mobile devices within respective weather reference areas as described below.

Figure 3:
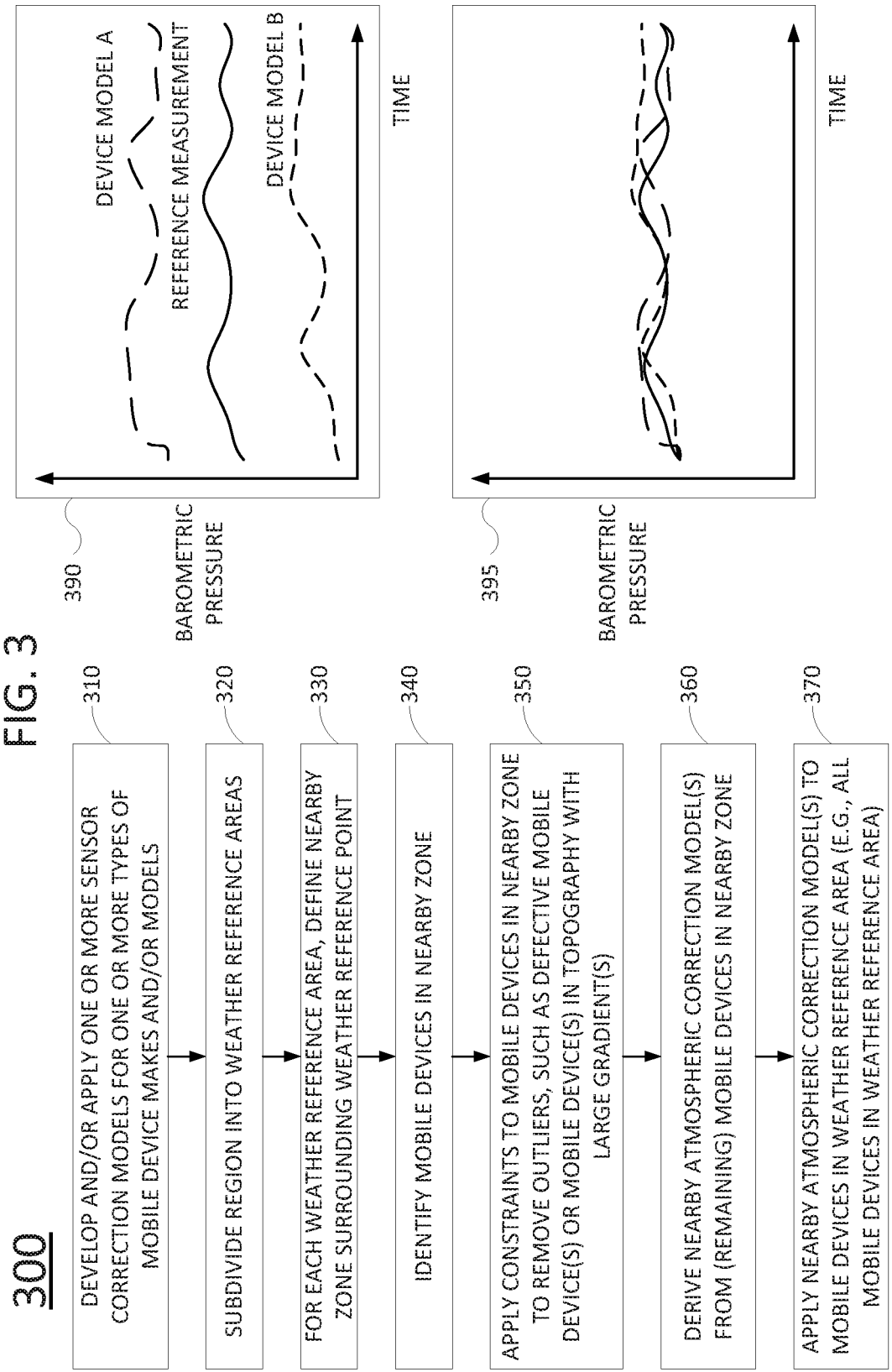
FIG. 3 illustrates example sensor correction and nearby correction processes, in accordance with the present disclosure.

FIG. 3 illustrates an example correction process 300, e.g., including a sensor correction process and a nearby atmospheric correction process, as described in greater detail below. Notably, different mobile device manufacturers and different models use different barometers (and/or other atmospheric sensors). Such barometers may have good precision in terms of detecting changes in barometric/atmospheric pressure, but may be less accurate for the purpose of estimating elevation. In other words, different device makes and/or models may report different barometric pressure measurements or other atmospheric measurements, even if physically located at the same place and at the same time. Thus, in one example the present disclosure may calibrate, or "correct" mobile device measurements to improve overall elevation and height-over-ground calculation accuracy.

In one example, the present disclosure may include a "sensor correction process." For instance, graph 390 illustrates plots of barometric pressure measurements over a period of time for a device of "device model A," a device of "device model B," and for a reference measurement (e.g., barometric pressure measurements of a calibration device, such as barometer in a laboratory setting). In one example, a sensor correction model may be derived per a temperature based linear function, such as:

$$P_{ref}=AP_{dev}+B, \text{ where } A=f_a(T), B=f_b(T) \qquad \text{Equation 1}$$

In the present example, A and B are functions of environment temperature T, $P_{dev}$ is the mobile device pressure reading, and $P_{ref}$ is the reference pressure measurement from the calibration device. In one example, a model per Equation 1, or a similar model, may be presented as a table in accordance with various pressure measurements taken in the laboratory under a series of conditions for different mobile device makes and/or models.

Graph 395 illustrates the same plots after application of a correction model, where the plots for device model A, device model B, and the reference are aligned. Although all three plot are align in this example, it should be noted that in another example, the sensor correction may not necessarily align measurements of device model A and device model B with the reference. Rather, it may be sufficient that sensor correction aligns measurements of different makes and/or models of mobile devices with each other. In one example, models for sensor correction are developed from a representative sampling of mobile devices of a particular make and/or model (e.g., as such mobile devices are developed and released to users).

In addition to sensor correction, the present disclosure may also include a "nearby atmospheric correction" (NAC) process, which is applied on a per-weather reference area basis. The calibration algorithm may be applied to make(s) and/or model(s) independently, or may be applied to all mobile devices, e.g., depending upon the diversity and/or number histogram of mobile device makes and/or models. If there is insufficient data and/or an insufficient number of mobile devices in a weather reference area, the algorithm may generate a correction model that applies for all mobile devices in the weather reference area. Otherwise, multiple correction models may be generated, e.g., for each of the different makes and/or models of mobile devices. In both scenarios, the correction model(s) may adjust barometric pressure measurements, such that different makes and/or models tend to report similar measurements when at substantially the same place at substantially the same time. It should be noted that the shift does not necessarily need to be accurate because the offset may be compensated in later operations described below. For instance, as shown in graph 395, the plots for device model A and device model B are aligned with each other, but not necessarily with the reference measurement.

In one example, the correction model(s) may be generated and applied in accordance with process 300. For instance, in a first stage 310, the process 300 may include developing one or more sensor correction models for one or more types of mobile device makes and/or models. In one example, the sensor correction model(s) may then be applied to barometric pressure readings that are collected from various mobile devices. These sensor-corrected/calibrated barometric pressure readings may then be saved for additional calibration via "nearby atmospheric correction" in following steps of the process 300.

In a second stage 320, the process 300 may subdivide a region into weather reference areas, if not done so already. At a third stage 330, the process 300 may, for each weather reference area, define a nearby zone surrounding a weather reference point (such as physical weather station or a "virtual" weather reference point). As long as the nearby zone is sufficiently small, it may be assumed that mobile devices in this nearby zone are on the same elevation level as the weather reference point and shall report the same atmospheric measurements (e.g., barometric pressure or other measurements) as the weather reference point. In one example, the nearby zone may be 100 meters, 500 meters, etc., e.g., depending upon the number and/or density of mobile devices in the nearby zone and/or the weather reference area more generally. In one example, different sizes of the "nearby zone" may be used for different weather reference areas. For instance, a larger nearby zone may be used in a less densely populated weather reference area in order to capture more mobile devices to be used in deriving the correction model(s) for the weather reference area.

In a fourth stage 340, for each weather reference area, the process 300 may identify mobile devices in the nearby zone. For instance, the positions/locations of mobile devices may be reported and obtained as latitude and longitude coordinates, or another form, to determine a distance to the weather reference point (also known in latitude and longitude coordinates, or otherwise in the same form as the location/position information for the mobile devices). In a fifth stage 350, the process 300 may apply one or more constraints to the mobile devices in the nearby zone that are identified in the fourth stage 340. For instance, the constraint(s) may comprise removing mobile devices that appear to be defective, such as having a faulty barometer, or that are reporting false data for some other reason. For instance, mobile devices may be removed when reporting a pressure 2-3 standard deviations away from other nearby devices, when reporting an outlier pressure compared with the reference point in a flat area, for example a 0.005 hPa threshold, which is approximately 45 meters at 72 Fahrenheit, and so forth. These thresholds are provided by way of example only, and it should be understood that such thresholds may be tuned over time to improve results. In any case, the threshold(s) may be quantified such that faulty mobile devices may be objectively excluded, in an automated matter.

Another constraint may be to exclude mobile devices located in topologies with large gradients, e.g., where there is a steep elevation in the terrain. A large gradient may be determined by referencing the position that is reported by the mobile device to the digital elevation model and then examining the data for nearby points to determine slopes/gradients in several direction (for instance). Where the gradient in any one direction or an overall gradient from the mobile device position out to a "nearby" area boundary (such as 100 meters, 500 meters, etc.) exceeds a selected threshold indicative of steep terrain and/or terrain with varying elevations, the mobile device may be excluded. It should be noted that such a slope/gradient threshold may be selected in advance (e.g., by a system operator) and/or may be adjusted in response to various factors, such as relaxing the threshold when too few mobile devices would be available with a stricter threshold.

At stage 360, the process 300 derives a nearby atmospheric correction model (e.g., for all mobile devices within the weather reference area) or multiple correction models (e.g., one for each mobile device make and/or model) from the mobile devices in the nearby zone (and in one example, excluding those that may be filtered-out at stage 350). In one example, a nearby atmospheric correction model is generated by comparing barometric pressure measurements from mobile devices in the nearby zone and the barometric pressure measurements of the weather reference point (or "barometric pressure metrics"—where there is no direct measurement of barometric pressure at the weather reference point, this term may be used to describe the calculated/interpolated barometric pressure measures that are attributed to the weather reference point). Again, the mobile devices may be considered collectively, or may be grouped by make and/or model, to calculate separate correction models. For a given correction model, the barometric pressure measurements of the applicable mobile devices may be collected for a certain duration of time, and then a multi-factor polynomial equation, a linear regression model, or the like may be created to fit the barometric pressure measurements of multiple devices with one another, and relative to the reference barometric pressure measurement (or reference barometric pressure metric, when not measured directly for a weather reference point). Each correction model may have an input term of a current barometric pressure measurement for a given device, and which may output a correction factor/value to apply the barometric pressure measurement (or which may directly output a corrected barometric pressure measurement).

At stage 370, the process 300 apples the nearby atmospheric correction model(s) to mobile devices in the weather reference area (e.g., all mobile devices therein). More specifically, the barometric pressure measurements that are reported by mobile devices in the weather reference area may be adjusted by applying the current, relevant correction model (e.g., a mobile device-general and/or specific make and/or model correction model) for the weather reference area. It should be noted that in one example, the barometric pressure measurements may have also previously been sensor-corrected/calibrated at stage 310 above.

It should be noted that each weather reference area may have a respective set of one or more nearby atmospheric correction models, which in one example may be derived and applied in accordance with the process 300. In one example, the correction models may be updated on a periodic basis. Alternatively, or in addition, the correction model(s) may be updated for a weather reference area when a weather reference point for the weather reference area is recalculated. Following the process 300 (e.g., for all weather reference areas) mobile device-reported barometric pressure measurements are therefore calibrated, allowing accurate elevation and height-over-ground calculations to be made for mobile device devices as follows.

FIG. 4 illustrates two stages (405 and 410) for the calculation of a mobile device elevation to mean sea level using a weather reference point (stage 405) and the calculation of a mobile device height over a local ground using a ground reference area. In stage 405, a mobile device elevation to mean sea level is calculated. In accordance with the present disclosure, the mobile device may be located in a weather reference area and the elevation of the mobile device (e.g., over mean sea level) may be calculated per Equation 2:

$$E_{dev} = \frac{\left(\left(\frac{P_0}{P}\right)^{1/5.257} - 1\right)T_{kelvin}}{0.0065} + E_{ref} \quad \text{Equation 2}$$

In Equation 2, P is the barometric pressure reading of the mobile device (e.g., in units of hPa or millibar), $P_0$ is a barometric pressure metric of the weather reference point (e.g., in units of hPa or millibar), $T_{kelvin}$ is a temperature metric in degrees Kelvin of the weather reference point, $E_{ref}$ is the elevation of the weather reference point (e.g., over mean sea level), and $E_{dev}$ is the elevation of the mobile device (e.g., over mean sea level). It should be noted that the first term on the right side of Equation 2 provides the elevation difference between the mobile device and the weather reference point (e.g., a vertical distance, where "vertical" is with respect to the center of the Earth). In one example, the elevation of the weather reference point (or "reference elevation") may be known in advance from data provided by an operator of the weather station, or otherwise made available, and/or may be obtained from one or more digital elevation models that may be used in accordance with the present disclosure. In one example, additional detailed information, such as a mounting height of the weather station barometer may also be provided and taken into account for $E_{ref}$. It should be noted that Equation 2 is just one example of calculating the elevation of a mobile device, taking into account weather information from a weather reference point. For instance, in other, further, and different examples, a different formula based upon $E_{ref}$, P, $P_0$, and $T_{kelvin}$ may be used, a different formula that further accounts for one or more of a humidity metric, a wind speed metric, etc. may be used, and so on.

It should also be noted that are referred to herein, a "barometric pressure metric" may comprise an actual barometric pressure measurement/reading, such as when the weather reference point is a physical weather station, or may comprise a barometric pressure measure that is interpolated/calculated from barometric pressure measurements/readings of one or more physical weather stations (e.g., located outside the weather reference area) or interpolated/calculated from one or more mobile devices within the weather reference area (e.g., crowdsourced from mobile devices in the weather reference area). Similarly, when the weather reference point comprises a physical weather station, a "temperature metric" may comprise a temperature measurement/reading of the weather station. On the other hand, when the weather reference point is not a physical weather station, the "temperature metric" may be a temperature measure that is calculated/interpolated from temperature measurements of one or more physical weather stations (e.g., located outside the weather reference area) or interpolated/calculated from one or more mobile devices within the weather reference area (e.g., crowdsourced from mobile devices in the weather reference area). Stage 450 returns the result of the Equation 2 calculation—the elevation of the mobile device relative to mean sea level.

As noted above, examples of the present disclosure may further include calculating the height of the mobile device relative to a local ground. An example (stage 410) is further illustrated in FIG. 4. For instance, the mobile device elevation to mean sea level is calculated in stage 405.

In one example, an elevation of a local ground relative to mean sea level is determined (e.g., in advance, or in response to commencing of stage 410). For instance, in order to calculate the height of the mobile device relative to local ground, each weather reference area may first be further divided into ground reference areas (e.g., ground blocks). In one example, a ground reference area size may be adjustable to balance computing performance and accuracy. In one example, the ground reference area is a discrete approximation of a real, continuous topography ground. For instance, a larger size of the ground reference area may improve computing performance, but with lower accuracy (and vice versa). However, in one example, the ground reference area may be made small enough to approximate that the ground is flat, or that an elevation gradient is within a limit. For example, in areas with sharply varying terrain (steep gradients, changing slopes, etc.) smaller ground reference areas may be used than for areas with relatively flat, unchanging terrain (quantified by lesser slopes/gradients).

For each ground reference area, an algorithm may be used to derive a local ground elevation to mean sea level. For instance, the algorithm may take the minimal or average elevation of "points" in the ground reference area, where each point may be a smallest size geographic unit or "sub-region" that may be available, e.g., a 1 square meter area, a 5 square meter area, a 10 square meter area, a 100 square meter area, etc. For example, the elevations of points within the ground reference area may be taken from the one or more digital elevation models that is/are being used. Alternatively, or in addition, the algorithm may use a more complex formula, such as applying constraints to exclude outliers with extreme gradient (e.g., over a designated threshold gradient, or slope), to smooth ground reference areas with adjacent ground reference areas so as to approximate a smooth border gradient, and so forth. After discretization, the ground reference area may be assigned a single elevation value relative to mean sea level.

In one example, a ground reference area discretization model for a region (e.g., a table or other data structure mapping elevations to ground reference areas) is pre-calculated and cached for further processing. For instance, ground reference area size may be selected in advance and then ground reference area elevations may be determined for ground reference areas of weather reference areas within the region (e.g., all ground reference areas for all of the weather reference areas). In any case, the elevation of local ground to mean sea level may be obtained. For instance, the mobile device may report a location, e.g., in latitude and longitude. The ground reference area containing the location may then be identified, and the elevation of the ground reference area (e.g., an average elevation or an estimated elevation that is otherwise calculated) may be obtained from the discretization model. It should be noted that in another example, the ground reference area and the elevation to be assigned thereto may be determined on the fly. For instance, for each calculation of a height of a mobile device over local ground, the ground reference area and elevation thereof may be determined (e.g., without prior calculation and storage in a ground reference area discretization model).

When the mobile device elevation and the local ground elevation are both obtained, the mobile device height relative to local ground may then be calculated. For instance, the elevation of the local ground, or ground reference area that is determined at step 2 may be subtracted from the mobile device elevation relative to mean sea level to provide the resulting mobile device height relative to the local ground. It should be noted that in some cases, the height relative to local ground may be negative. For instance, the mobile device may be located in a basement. It should be noted that stages 405 and 410 may be applied with respect to various mobile devices within a same weather reference area and with respect to multiple weather reference areas in region, with the result that heights of mobile devices over local ground levels may be determined, stored, streamed, and/or used for a variety of purposes.

Figure 5:
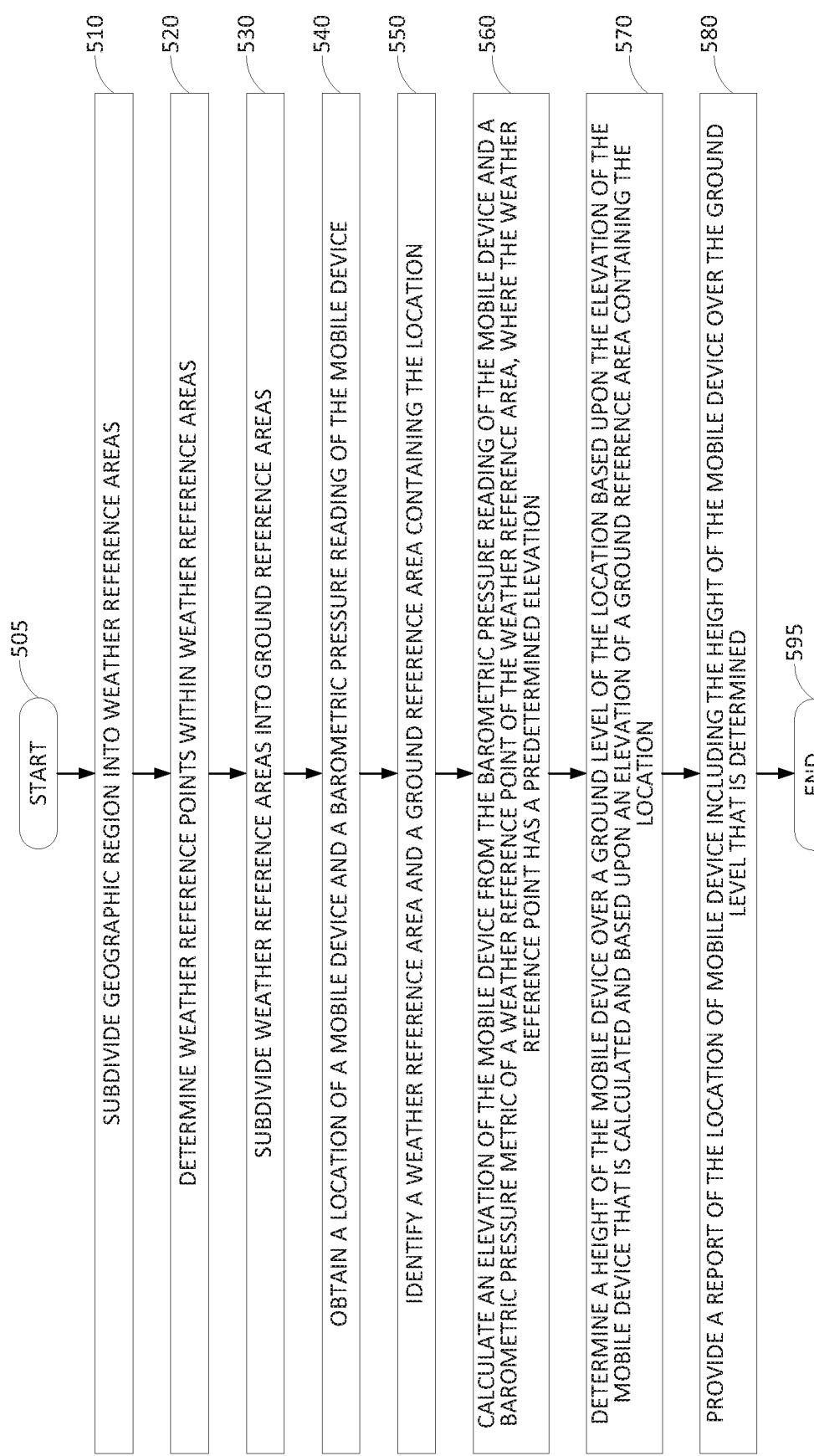
FIG. 5 illustrates a flowchart of an example method for determining a height of a mobile device over a ground level based upon an elevation of the mobile device that is calculated from a barometric pressure reading of the mobile device and a barometric pressure metric of a weather reference point and further based upon an elevation of a ground reference area.

FIG. 5 illustrates a flowchart of an example method 500 for determining a height of a mobile device over a ground level based upon an elevation of the mobile device that is calculated from a barometric pressure reading of the mobile device and a barometric pressure metric of a weather reference point and further based upon an elevation of a ground reference area. In one example, steps, functions and/or operations of the method 500 may be performed by a device and/or processing system as illustrated in FIG. 1, e.g., by one or more of servers 112, or any one or more components thereof, or by server(s) 112 and/or any one or more components thereof in conjunction with one or more other components of the system 100, such as one or more of servers 125, elements of wireless access network(s) 115, weather stations 196-198, mobile devices 141-143, and so forth. In one example, the steps, functions, or operations of method 500 may be performed by a computing device or processing system, such as computing system 600 and/or hardware processor element 602 as described in connection with FIG. 6 below. For instance, the computing system 600 may represent any one or more components of the system 100 that is/are configured to perform the steps, functions and/or operations of the method 500. Similarly, in one example, the steps, functions, or operations of the method 500 may be performed by a processing system comprising one or more computing devices collectively configured to perform various steps, functions, and/or operations of the method 500. For instance, multiple instances of the computing system 600 may collectively function as a processing system. For illustrative purposes, the method 500 is described in greater detail below in connection with an example performed by a processing system. The method 500 begins in step 505 and proceeds to step 510.

At step 510, the processing system may subdivide a geographic region into weather reference areas, such as weather reference blocks. For instance, a weather reference area may comprise a 5 km square region, a 10 km square region, a 5 mile square region, etc. In one example, the weather reference area may be determined in accordance with a geographic information system (GIS) model that includes information on sub-regions, or "points," with a geographic region, where for each sub-region the information comprise a latitude, a longitude, and an elevation. For instance, a weather reference area may be comprised of a number of sub-regions to provide an overall weather reference area comprising a 5 km block, or grid, while each point or "sub-region" may represent 100 square meters. Thus, there may be 2500 "sub-regions" within a 5 km square weather reference area. It should be noted that each sub-region may be considered a point, or location, insofar as the sub-region may be the smallest level of geographic precision available from the GIS model. The size of the weather reference areas may be selected at step 510 to balance computing performance and accuracy, and may be selected in accordance with an operator preference regarding a particular use case, or use cases.

At step 520, the processing system may determine weather reference points within the weather reference areas. For example, as described above, each of the plurality of weather reference areas may include a respective weather reference point. For each weather reference area, the weather reference point may comprise a physical weather station, or may comprise a "virtual" weather reference point. For instance, the weather reference point may be interpolated either from one or more other weather stations outside the weather reference area, interpolated from selected mobile devices from in the weather reference area, or selected based upon a different criteria, such as the center of the weather reference area, a flat area closest to the center of the weather reference area, and so forth.

At step 530, the processing system may subdivide weather reference areas into ground reference areas. For example, the weather reference areas may be comprised of a first number of the sub-regions, and the ground reference areas may be comprised of a second number of the sub-regions, wherein the second number is less than the first number. For example, each ground reference area may be composed of points or "sub-regions" to provide an overall ground reference area of 500 square meters, 200 square meters, etc. For instance, with a 500 square meter ground reference area size and a 100 square meter point/sub-region size, there may be 25 points/sub-regions within each ground reference area. In addition, in a 5 km square weather reference area with 500 square meter ground reference areas, there may be 100 ground reference areas contained within the weather reference area. In one example, a ground reference area size may be selected at step 530 to balance computing performance and accuracy, and may be selected in accordance with an operator preference regarding a particular use case, or use cases. In one example, a ground reference area size may be a single sub-region, e.g., a smallest unit of measure available from a GIS model being used. In one example, step 530 may include calculating elevations of ground reference areas, e.g., as described above, such as by averaging, taking a minimum elevation from among the points/sub-regions within a ground reference area, removing outliers, smoothing with adjacent ground reference areas, and so forth. After discretization, each ground reference area may be assigned a single elevation value relative to sea level (e.g., mean sea level).

At step 540, the processing system obtains a location of a mobile device and a barometric pressure reading (or atmospheric pressure reading) of the mobile device. For instance, the barometric pressure reading may comprise a measurement taken via a barometer of the mobile device. In one example, the barometric pressure reading may comprise an average of barometric pressure measurements taken in a time interval, e.g., a one minute average, a 30 second average, a five minute average, a five minute moving average taken each minute, etc. In one example, the location of the mobile device may comprise a latitude and a longitude. In another example, the location of the mobile device may be mapped to a latitude and longitude. For instance, if the mobile device reports location data in another format, the location data may be translated to latitude and longitude.

At step 550, the processing system identifies a weather reference area and a ground reference area containing the location of the mobile device. For instance, the latitude and longitude of the mobile device may be mapped to one of the weather reference areas that may be defined at step 510. Similarly, the latitude and longitude of the mobile device may be mapped to one of the ground reference areas that may be defined at step 530.

At step 560, the processing system calculates an elevation of the mobile device over sea level (e.g., mean sea level) from the barometric pressure reading of the mobile device and a barometric pressure metric of a weather reference point of the weather reference area, where the weather reference point has a predetermined elevation over sea level (e.g., mean sea level). In one example, the calculating of the elevation of the mobile device is further in accordance with a temperature metric of the weather reference point. As noted above, the weather reference area may be one of a plurality of weather reference areas within a geographic region. In addition, the weather reference area may comprise a bounded geographic area that is defined to include the weather reference point. As noted above, the weather reference point may comprise a physical weather station, e.g., comprising at least a barometer (and in one example, a temperature sensor/thermometer). In such an example, the weather station may provide the barometric pressure metric, e.g., a barometric pressure reading by the weather station. The barometric pressure reading may comprise a barometer measurement, or an average of barometer measurements, a moving average of barometer measurements, etc. Similarly, the temperature metric may comprise a thermometer temperature measurement (or an average, moving average, or the like of multiple temperature measurements in a time period). In addition, the elevation of the physical weather station may be predetermined insofar as the elevation may be provided by an operator of the physical weather station. Alternatively, or in addition, a location (e.g., in latitude and longitude only) may be referenced to a sub-region/location within a GIS model to look-up the elevation.

In one example, the weather reference point may comprise a "virtual" weather reference point. Accordingly, in one example, the barometric pressure metric of the weather reference point may be estimated from at least one barometric pressure reading of at least one physical weather station located outside the weather reference area. In one example, the barometric pressure metric of the weather reference point may be interpolated from barometric pressure readings of two or more physical weather stations. For instance, the barometric pressure metric of the weather reference point may be calculated by taking an average or weighted average of barometric pressure readings from the physical weather stations. In various additional examples, the barometric pressure metric of a weather reference point may be calculated in various ways, such as using weather forecast model, and so forth. In such an example, a temperature metric may be similarly calculated. In addition, the elevation of the weather reference point may be determined from an elevation for the particular location of the weather reference point contained in a GIS model that may be used by the processing system in connection with the method 500.

In still another example, the barometric pressure metric comprises a crowdsourced barometric pressure metric that is calculated from a plurality of barometric pressure readings of a plurality of mobile devices that are located within the weather reference area. For example, the plurality of mobile devices may be selected by identifying one or more flat zones in the weather reference area, identifying a flat zone of the one or more flat zones with a largest number of mobile devices, and selecting the plurality of mobile devices from the flat zone with the largest number of mobile devices. In one example, a "flat zone" may comprise a threshold number of contiguous sub-regions from a geographic information system (GIS) (e.g., where each sub-region may be a 30 square meter sub-region, a 10 square meter sub-region, etc. depending upon the precision of the GIS) which have less than a threshold slope/gradient for all pairs of directly adjacent sub-regions within the zone. In one example, the barometric pressure metric may be calculated by averaging the plurality of barometric pressure readings (e.g., a direct average, a weighted average, etc.).

In one example, the weather reference point may be selected to comprise a centroid of locations of the plurality of mobile devices. In another example, the weather reference point may be selected to comprise a central point of the flat zone. It should be noted that in one example, the weather reference point may be pre-determined in accordance with operations of step 520. In any case, the elevation of the weather reference point may be known from a GIS model being used by the processing system in connection with the method 500. It should also be noted that for a weather reference area having a crowdsourced weather reference point, the weather reference point may be recalculated on a periodic basis or in response to a particular criteria (e.g., when mobile devices move, every 15 minutes, every hour, when data may become stale, such as due to temperature changes, etc.).

In one example, a temperature metric of the weather reference point may be similarly calculated from temperature readings of the plurality of mobile devices. However, in one example, the barometric pressure metric may be crowdsourced from the plurality of mobile devices, while a temperature metric may be calculated from one or more weather stations outside the weather reference area. In one example, the operations of step 560 may include aspects described above in connection with the example(s) of FIG. 2. In addition, step 560 may include operations such as described above in connection with stage 405 of FIG. 4, e.g., including calculations per Equation 2.

In one example, step 560 may include applying a sensor correction factor to the barometric pressure reading of the mobile device in accordance with a sensor correction model associated with the mobile device (e.g., for a make and/or a model type of the mobile device). In one example, step 560 may alternatively or additionally include applying a correction factor associated with the weather reference area. For instance, the correction factor(s) may be applied to the barometric pressure reading of the mobile device. In one example, the correction factor associated with the weather reference area may be calculated in accordance with a learning function, e.g., a "nearby atmospheric correction model" that is to align a plurality of barometric pressure readings of a plurality of different types of mobile devices under the same atmospheric conditions. In one example, the learning function may be generated in accordance with offsets between the plurality of barometric pressure readings of the plurality of different types of mobile devices and at least one barometric pressure metric of the weather reference point. In one example, "generating" the learning function may include updating and/or maintaining the learning function periodically with new data to remain current. In addition, in one example, the plurality of barometric pressure readings may be obtained from the plurality of different types of mobile devices within a threshold distance of the weather reference point, where the threshold distance is less than a distance from the weather reference point to a boundary of the weather reference area. For instance, the mobile device may be nearby the weather reference point (such as within 100 meters of the weather reference point, 500 meters of the weather reference point, etc.). In one example, the generating of the correction factor and the applying of the correction factor at step 560 may comprise the same or similar operations as described above in connection with the example process 300 of FIG. 3.

At step 570, the processing system determines a height of the mobile device over a ground level of the location based upon the elevation of the mobile device that is calculated and based upon an elevation of a ground reference area containing the location. For instance, the height may comprise a vertical distance between the mobile device and the ground directly below the mobile device at the location. It should be noted that if the mobile device is below a ground level, such as in a basement of a building, working on underground utilities, etc., the height may be a negative value in reference to a ground elevation nearby the location.

As noted above, a ground reference area may be a smaller area within the weather reference area, and may comprise an estimate of the ground directly below the mobile device. In one example, step 570 may include operations such as described above in connection with stage 410 of FIG. 4 (e.g., subtracting the elevation of the ground reference area, or "local ground elevation," from the elevation of the mobile device over sea level that is determined at step 570.

At step 580, the processing system provides a report of the location of mobile device, including the height of the mobile device over the ground level that is determined. In one example, the report may include information regarding the locations of various mobile devices within the weather reference area and/or the region (including respective height-over-local ground information). In one example, the report may be sent to one or more other automated systems, such as a network planning and/or operation system of a telecommunication network operator controlling the processing system performing the method 500, or a processing system of a public safety entity (such as a city fire department). For instance, the information of the heights of various mobile devices in an area throughout the day may be used to select cellular coverage configurations, such as adjusting base station antenna tilt, adjusting beamforming parameters, adjusting multi-path utilization schemes, and so forth. In another scenario, in the event of a fire in a multi-story building, it may be useful for a fire department to have information regarding the possible numbers of mobile devices at different heights (and hence the numbers of people who may be located on different floors). In one example, an individual in need of assistance may call 911 but may become incapacitated or may be disoriented, and may be unable to provide details of his or her location (e.g., including on which floor of a building he or she may be located). In such case, the processing system may provide the report that includes the device location (including height over ground), which may better allow the individual using the mobile device to be located.

Following step 580, the method 500 proceeds to step 595. At step 595, the method 500 ends.

It should be noted that the method 500 may be expanded to include additional steps, or may be modified to replace steps with different steps, to combine steps, to omit steps, to perform steps in a different order, and so forth. For instance, in one example the processing system may repeat one or more steps of the method 500 with respect to another mobile device or various additional mobile devices, with respect to the same mobile device at a different time and/or a different location, and so forth. In one example, the method 500 may be expanded to include initiating an automated action in response to the report of step 580, such as automatically dispatching aid to a location, e.g., providing information or instructions to direct a first responder, a drone, etc. to a location of the mobile device (including providing the height information so as to allow navigation to a correct floor of a multi-story building).

In another example, the method 500 may be expanded to include calculating and recalculating the weather reference point (e.g., where the weather reference point and the barometric pressure metric (and/or temperature metric) are crowdsourced from mobile devices. In another example, the method 500 may include pre-calculating sensor correction model(s) for mobile devices and/or mobile device types (e.g., makes and/or models). In still another example, the method 500 may include calculating nearby atmospheric correction model(s) for one or more weather reference areas. Similarly, other aspects described above in connection with any of FIGS. 1-4 may be incorporated as additional and/or alternative steps of the method 500, or as additional and/or alternative operations of any of the steps 510-580 described above. Thus, these and other modifications are all contemplated within the scope of the present disclosure.

In addition, although not expressly specified above, one or more steps of the method 500 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 5 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 6 depicts a high-level block diagram of a computing system 600 (e.g., a computing device or processing system) specifically programmed to perform the functions described herein. For example, any one or more components, devices, and/or systems illustrated in FIG. 1, or described in connection with FIGS. 2-5, may be implemented as the computing system 600. As depicted in FIG. 6, the computing system 600 comprises a hardware processor element 602 (e.g., comprising one or more hardware processors, which may include one or more microprocessor(s), one or more central processing units (CPUs), and/or the like, where the hardware processor element 602 may also represent one example of a "processing system" as referred to herein), a memory 604, (e.g., random access memory (RAM), read only memory (ROM), a disk drive, an optical drive, a magnetic drive, and/or a Universal Serial Bus (USB) drive), a module 605 for determining a height of a mobile device over a ground level based upon an elevation of the mobile device that is calculated from a barometric pressure reading of the mobile device and a barometric pressure metric of a weather reference point and further based upon an elevation of a ground reference area, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 602 is shown, the computing system 600 may employ a plurality of hardware processor elements. Furthermore, although only one computing device is shown in FIG. 6, if the method(s) as discussed above is implemented in a distributed or parallel manner for a particular illustrative example, e.g., the steps of the above method(s) or the entire method(s) are implemented across multiple or parallel computing devices, then the computing system 600 of FIG. 6 may represent each of those multiple or parallel computing devices. Furthermore, one or more hardware processor elements (e.g., hardware processor element 602) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 602 can also be configured or programmed to cause other devices to perform one or more operations as discussed above. In other words, the hardware processor element 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 605 for determining a height of a mobile device over a ground level based upon an elevation of the mobile device that is calculated from a barometric pressure reading of the mobile device and a barometric pressure metric of a weather reference point and further based upon an elevation of a ground reference area (e.g., a software program comprising computer-executable instructions) can be loaded into memory 604 and executed by hardware processor element 602 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 602) executing the computer-readable instructions relating to the above described method(s) can be perceived as a programmed processor or a specialized processor. As such, the present module 605 for determining a height of a mobile device over a ground level based upon an elevation of the mobile device that is calculated from a barometric pressure reading of the mobile device and a barometric pressure metric of a weather reference point and further based upon an elevation of a ground reference area (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:
1. A method comprising:
obtaining, by a processing system including at least one processor, a location of a mobile device and a barometric pressure reading of the mobile device;
identifying, by the processing system, a weather reference area and a first ground reference area containing the location, wherein the weather reference area contains a plurality of ground reference areas, wherein the first ground reference area is one of the plurality of ground reference areas;
calculating, by the processing system, an elevation of the mobile device from the barometric pressure reading of the mobile device and a barometric pressure metric of a weather reference point of the weather reference area, wherein the weather reference point has a predetermined elevation, wherein the weather reference point is located in a second ground reference area of the plurality of ground reference areas that is different from the first ground reference area, wherein the elevation of the mobile device is calculated using the barometric pressure reading of the mobile device, the barometric pressure metric of the weather reference point, a temperature metric of the weather reference point, and the predetermined elevation of the weather reference point;

determining, by the processing system, a height of the mobile device over a ground level of the location based upon the elevation of the mobile device that is calculated and based upon an elevation of the first ground reference area containing the location; and providing, by the processing system, a report of the location of the mobile device including the height of the mobile device over the ground level that is determined.

2. The method of claim 1, wherein the elevation of the mobile device is calculated using $$E_{dev} = \frac{\left(\left(\frac{P_0}{P}\right)^{1/5.257} - 1\right)T_{kelvin}}{0.0065} + E_{ref},$$

where P is the barometric pressure reading of the mobile device, $P_0$ is the barometric pressure metric of the weather reference point, $T_{kelvin}$ is the temperature metric in degrees Kelvin of the weather reference point, $E_{ref}$ is the elevation of the weather reference point, and $E_{dev}$ is the elevation of the mobile device.

3. The method of claim 1, wherein the calculating the elevation of the mobile device from the barometric pressure reading of the mobile device includes applying a correction factor associated with at least one of: a make of the mobile device or a model of the mobile device.

4. The method of claim 1, wherein the calculating the elevation of the mobile device from the barometric pressure reading of the mobile device includes applying a correction factor associated with the weather reference area.

5. The method of claim 4, wherein the correction factor associated with the weather reference area is calculated using a learning function that is to align a plurality of barometric pressure readings of a plurality of different types of mobile devices under the same atmospheric conditions, wherein the learning function is generated using offsets between the plurality of barometric pressure readings of the plurality of different types of mobile devices and at least one barometric pressure metric of the weather reference point.

6. The method of claim 5, wherein the plurality of barometric pressure readings is obtained from the plurality of different types of mobile devices within a threshold distance of the weather reference point, wherein the threshold distance is less than a distance from the weather reference point to a boundary of the weather reference area.

7. A non-transitory computer-readable medium storing instructions which, when executed by a processing system including at least one processor, cause the processing system to perform operations, the operations comprising:

obtaining a location of a mobile device and a barometric pressure reading of the mobile device;

identifying a weather reference area and a first ground reference area containing the location, wherein the weather reference area contains a plurality of ground reference areas, wherein the first ground reference area is one of the plurality of ground reference areas;

calculating an elevation of the mobile device from the barometric pressure reading of the mobile device and a barometric pressure metric of a weather reference point of the weather reference area, wherein the weather reference point has a predetermined elevation, wherein the weather reference point is located in a second ground reference area of the plurality of ground reference areas that is different from the first ground reference area, wherein the elevation of the mobile device is calculated using the barometric pressure reading of the mobile device, the barometric pressure metric of the weather reference point, a temperature metric of the weather reference point, and the predetermined elevation of the weather reference point;

determining a height of the mobile device over a ground level of the location based upon the elevation of the mobile device that is calculated and based upon an elevation of the first ground reference area containing the location; and providing a report of the location of the mobile device including the height of the mobile device over the ground level that is determined.

8. The non-transitory computer-readable medium of claim 7, wherein the elevation of the mobile device is calculated using $$E_{dev} = \frac{\left(\left(\frac{P_0}{P}\right)^{1/5.257} - 1\right)T_{kelvin}}{0.0065} + E_{ref},$$

where P is the barometric pressure reading of the mobile device, $P_0$ is the barometric pressure metric of the weather reference point, $T_{kelvin}$ is the temperature metric in degrees Kelvin of the weather reference point, $E_{ref}$ is the elevation of the weather reference point, and $E_{dev}$ is the elevation of the mobile device.

9. The non-transitory computer-readable medium of claim 7, wherein the calculating the elevation of the mobile device from the barometric pressure reading of the mobile device includes applying a correction factor associated with at least one of: a make of the mobile device or a model of the mobile device.

10. The non-transitory computer-readable medium of claim 7, wherein the calculating the elevation of the mobile device from the barometric pressure reading of the mobile device includes applying a correction factor associated with the weather reference area.

11. The non-transitory computer-readable medium of claim 10, wherein the correction factor associated with the weather reference area is calculated using a learning function that is to align a plurality of barometric pressure readings of a plurality of different types of mobile devices under the same atmospheric conditions, wherein the learning function is generated using offsets between the plurality of barometric pressure readings of the plurality of different types of mobile devices and at least one barometric pressure metric of the weather reference point.

12. The non-transitory computer-readable medium of claim 11, wherein the plurality of barometric pressure readings is obtained from the plurality of different types of mobile devices within a threshold distance of the weather reference point, wherein the threshold distance is less than a distance from the weather reference point to a boundary of the weather reference area.

13. An apparatus comprising:

a processing system including at least one processor; and a computer-readable medium storing instructions which, when executed by the processing system, cause the processing system to perform operations, the operations comprising:

obtaining a location of a mobile device and a barometric pressure reading of the mobile device;

identifying a weather reference area and a first ground reference area containing the location, wherein the weather reference area contains a plurality of ground reference areas, wherein the first ground reference area is one of the plurality of ground reference areas;

calculating an elevation of the mobile device from the barometric pressure reading of the mobile device and a barometric pressure metric of a weather reference point of the weather reference area, wherein the weather reference point has a predetermined elevation, wherein the weather reference point is located in a second ground reference area of the plurality of ground reference areas that is different from the first ground reference area, wherein the elevation of the mobile device is calculated using the barometric pressure reading of the mobile device, the barometric pressure metric of the weather reference point, a temperature metric of the weather reference point, and the predetermined elevation of the weather reference point;

determining a height of the mobile device over a ground level of the location based upon the elevation of the mobile device that is calculated and based upon an elevation of the first ground reference area containing the location; and providing a report of the location of the mobile device including the height of the mobile device over the ground level that is determined.

14. The apparatus of claim 13, wherein the elevation of the mobile device is calculated using $$E_{dev} = \frac{\left(\left(\frac{P_0}{P}\right)^{1/5.257} - 1\right)T_{kelvin}}{0.0065} + E_{ref},$$

where P is the barometric pressure reading of the mobile device, $P_0$ is the barometric pressure metric of the weather reference point, $T_{kelvin}$ is the temperature metric in degrees Kelvin of the weather reference point, $E_{ref}$ is the elevation of the weather reference point, and $E_{dev}$ is the elevation of the mobile device.

15. The apparatus of claim 13, wherein the calculating the elevation of the mobile device from the barometric pressure reading of the mobile device includes applying a correction factor associated with at least one of: a make of the mobile device or a model of the mobile device.

16. The apparatus of claim 13, wherein the calculating the elevation of the mobile device from the barometric pressure reading of the mobile device includes applying a correction factor associated with the weather reference area.

17. The apparatus of claim 16, wherein the correction factor associated with the weather reference area is calculated using a learning function that is to align a plurality of barometric pressure readings of a plurality of different types of mobile devices under the same atmospheric conditions, wherein the learning function is generated using offsets between the plurality of barometric pressure readings of the plurality of different types of mobile devices and at least one barometric pressure metric of the weather reference point.

18. The apparatus of claim 17, wherein the plurality of barometric pressure readings is obtained from the plurality of different types of mobile devices within a threshold distance of the weather reference point, wherein the threshold distance is less than a distance from the weather reference point to a boundary of the weather reference area.

* * * * *